UNITED STATES PATENT OFFICE.

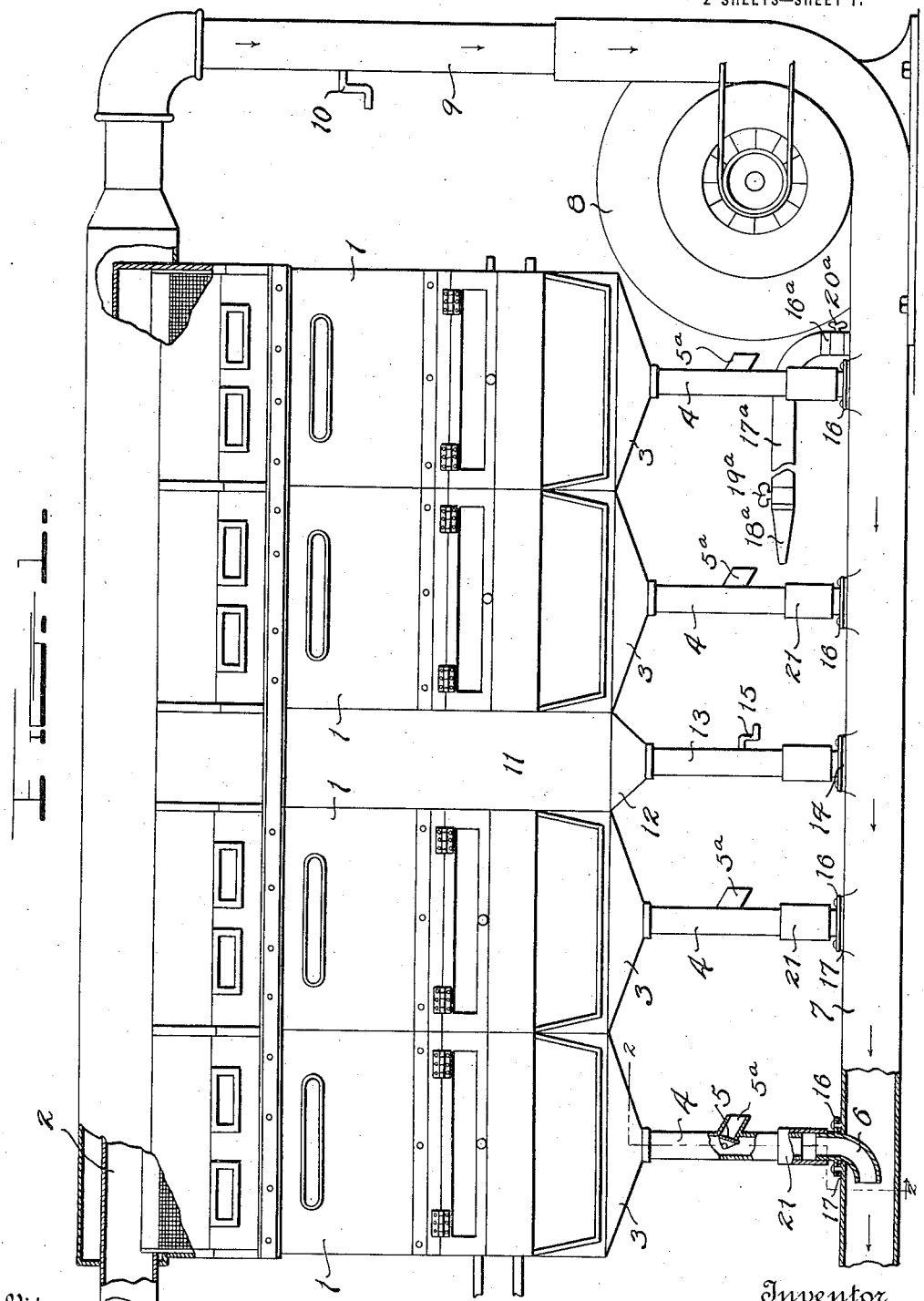

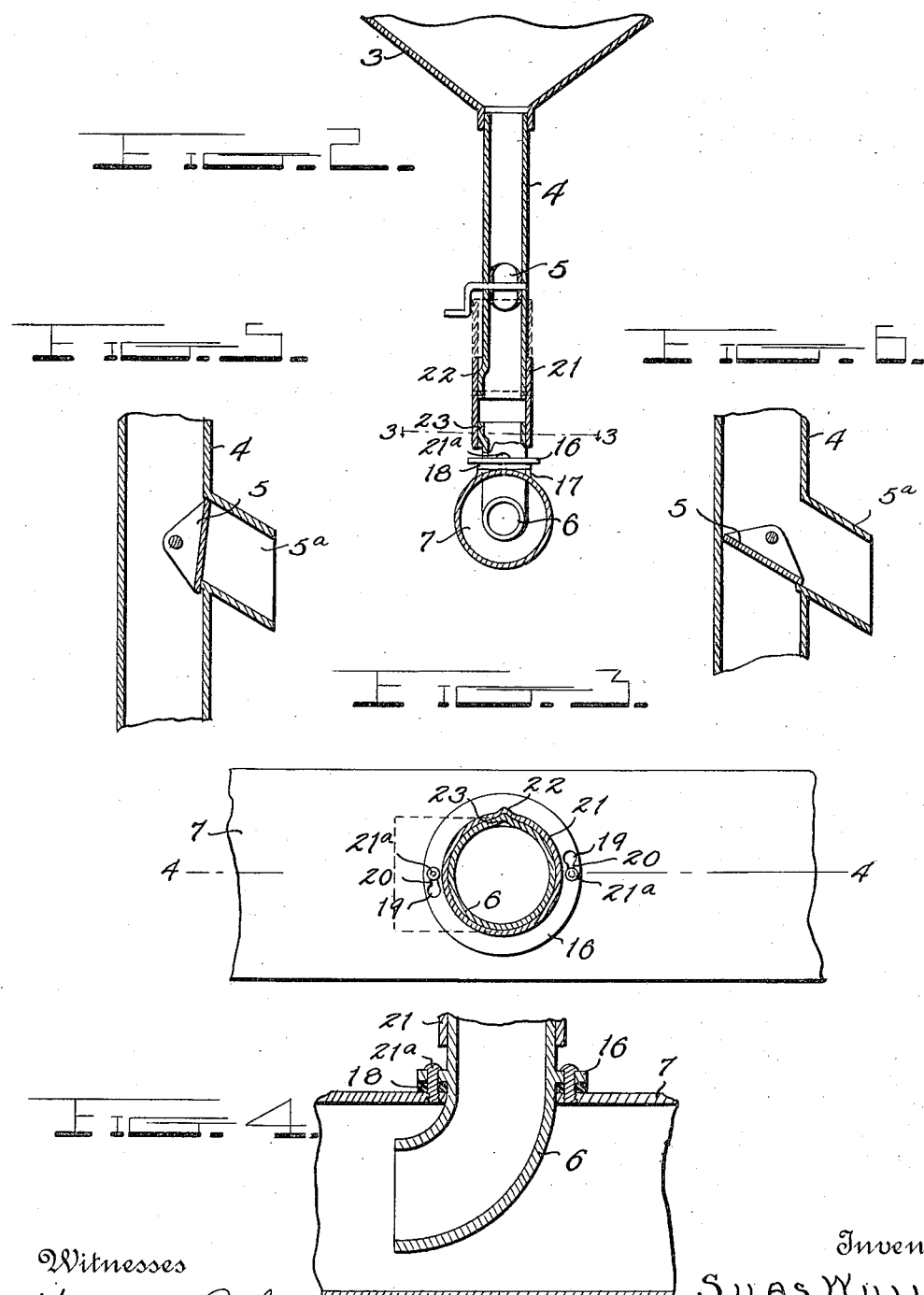

SILAS WILLIS, OF NOBLE, OKLAHOMA.

PNEUMATIC SEED AND DUST CONVEYER FOR COTTON-GINS.

1,156,196.   Specification of Letters Patent.   Patented Oct. 12, 1915.

Application filed June 2, 1914.   Serial No. 842,408.

*To all whom it may concern:*

Be it known that I, SILAS WILLIS, citizen of the United States, residing at Noble, in the county of Cleveland and State of Oklahoma, have invented certain new and useful Improvements in Pneumatic Seed and Dust Conveyers for Cotton-Gins, of which the following is a specification.

The present invention relates to a pneumatic device for carrying away the seed and dust from cotton gins, and has for its object to provide a device of this character which embodies novel features of construction whereby it can be readily attached to any gin and operated by the same fan employed for operating the pneumatic feeder without placing any appreciable amount of extra work or pull upon the fan.

A further object of the invention is to provide a device of this character which is comparatively simple and inexpensive in its construction, which can be readily cleaned, which will operate in an effective manner to carry the seed and dust away from the cotton gin so as to always maintain the same in a clean condition, and which will provide a satisfactory substitute for the usual auger or belt conveyer, the latter being objectionable for the reason that they quickly become worn and cause great annoyance by frequent clogging.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a battery of cotton gins provided with a pneumatic seed and dust conveyer constructed in accordance with the invention, portions being broken away and shown in section. Fig. 2 is an enlarged sectional view on the line 2—2 of Fig. 1. Fig. 3 is a transverse sectional view on the line 3—3 of Fig. 2. Fig. 4 is a vertical sectional view on the line 4—4 of Fig. 3. Fig. 5 is a detail sectional view of the cut-off valve in the seed pipe, showing the same in an open position. Fig. 6 is a similar view showing the valve in a closed position.

Corresponding and like parts are referred to in the following description and indicated in all the views of the drawings by the same reference characters.

Specifically describing the present embodiment of the invention, the numerals 1 designate cotton gins which may be of any conventional construction and are shown as arranged in groups of two each, although it will be obvious that the number of cotton gins in each group is immaterial and may be varied as found desirable. The usual suction pipe 2 extends across the top of the cotton gins and is employed for feeding the seed cotton to the gins. A seed pan 3 is arranged under each of the gins so as to receive the seeds as they are separated from the cotton. The bottoms of the various pans 3 are all inclined toward a discharge opening which communicates with a downwardly extending seed pipe 4, each of the said pipes having a suitable valve or cut-off 5 arranged therein. The lower end of each of the seed pipes 4 communicates with an elbow 6 which projects into a main air pipe 7 which preferably extends along the bottom of the cotton gins, although the exact positioning thereof is immaterial. The discharge end of the main air pipe 7 may lead to a seed house or any other suitable receptacle in which it is desired to collect the seed and dust, while the opposite end of the main air pipe 7 communicates with a fan 8, said fan being also connected by the pipe 9 to the suction feed pipe 2. A suitable valve 10 is shown as interposed in the length of the pipe 9. The lower ends of the elbows 6 extend downwardly into the main pipe 7 and are arranged so that the discharge ends thereof face in the same direction as the discharge end of the main air pipe 7 and are centrally disposed within the said main air pipe. With this construction it will be obvious that the air passing through the main air pipe 7 from the fan 8 toward the discharge end of the pipe 7, in the direction indicated by the arrows will serve to produce suction through the elbows 6 and seed pipes 4 so as to draw the seed from the pans 3 downwardly into the main air pipe 7. After the seed enter the said air pipe 7 they will be carried by a current of air to the discharge end thereof and deposited in the seed house or some suitable receptacle. The dust collecting in the space 11 between the groups of cotton gins 1 will drop into a dust pan 12 and be carried through a dust pipe 13 and elbow 14 to the main air pipe 7 in the same manner that the seeds are carried from the seed pans 3 to the main air pipe 7. A suitable valve 15 is interposed in the length of the dust pipe 13.

The main air pipe 7 is provided at a suitable point, preferably adjacent to the fan 8, with a branch 16ª which may have a suitable length of flexible hose 17ª attached thereto, said hose terminating in a nozzle 18ª. A suitable valve 19ª is provided for the nozzle 18ª, and in a similar manner a suitable valve 20ª is provided for the branch 16ª. This nozzle 18ª is designed to be used for cleaning the gin saws when such becomes necessary, the air emerging through the nozzle 18ª in a jet which can be directed against the teeth of the gin saws so as to readily remove any accumulations of sand or dirt therefrom.

The elbows 6 are preferably detachably connected to the seed pipes 4 and main air pipe 7 so that they can be readily disconnected from both members for the purpose of cleaning or replacing parts should this at any time be found desirable. The lower arms of the elbows are designed to pass freely through the openings in the pipe 7, while the upper arms thereof are provided with an annular flange 16 adapted to engage a seat 17 surrounding the opening of the pipe 7 to properly position the elbow. Suitable packing 18 may be interposed between the flange 16 and seat 17 to provide a tight joint, and the flange is provided at diametrically opposite points with openings 19 communicating with slots 20. These openings 19 may receive headed studs 21ª projecting from the seat 17 and the elbow then turned to bring the shanks of the studs into the slots 20, thereby locking the elbow to the air pipe and properly positioning the same with the lower arm thereof extending toward the discharge end of the main air pipe and disposed centrally within the main air pipe. A sleeve 21 is slidably mounted upon the lower end of the seed pipe 4 and is moved downwardly into engagement with the elbow 6 after the latter has been properly applied to the main air pipe, thereby connecting the elbow to the seed pipe and producing a substantially air-tight joint between the said members. This sleeve 21 preferably has a longitudinal groove 22 pressed outwardly from the interior thereof for engagement with ribs 23 upon the lower end of the seed pipe 4 and the upper arm of the elbow 6. These ribs 23 are so positioned that it is impossible to move the sleeve 21 into engagement with the elbow until after the elbow is properly applied to the main air pipe with the discharge end thereof facing toward the discharge end of the main air pipe. This construction admits of the parts being readily assembled or taken apart as may be necessary. The construction of the elbow 14 and the manner of applying the same to the main air pipe 7 and connecting it to the dust pipe 4 is identical with the construction just described and need not be described in detail.

The valve 5 in each of the seed pipes 4 is preferably in the form of a cut-off valve which, when in an open position, as indicated by Fig. 5, permits the seeds to pass freely through the seed pipe, while when swung into a closed position deflects the seeds into a lateral spout 5ª so that they may be discharged upon the floor at one side of the seed pipe. Such a construction is found necessary where the farmer whose cotton is being ginned insists that the seed from his particular cotton be returned to him for planting purposes. It frequently happens that farmers have a particular and superior class of cotton and do not care to take seed from the general mixture in the seed box for planting, but prefer to have seed from their particular cotton for planting purposes. In such instance some form of cut-off such as has been shown is quite essential.

Having thus described the invention, what I claim as new and desire to secure by Letters Patent, is:—

1. A pneumatic conveyer adapted to be connected to a battery of cotton gins and including a main pneumatic conveyer pipe, independent seed pipes leading from the various gins to the main pneumatic conveyer pipe, and means in each seed pipe for diverting the seed whereby the seed of any gin may be collected separately.

2. A pneumatic seed conveyer for use in connection with a battery of cotton gins, including a main pneumatic conveyer pipe, independent seed pipes leading from the several gins to the main pneumatic conveyer pipe, a lateral discharge spout projecting from each of the seed pipes, and a valve mounted within each of the seed pipes so as to close the lateral spout when in one position and cause the seed to be diverted through the same when in another position, thereby enabling the seed from any gin to be collected separately when desired.

In testimony whereof I affix my signature in presence of two witnesses.

SILAS WILLIS.

Witnesses:
K. F. AMREIN,
W. H. MAYERS.